April 14, 1970 T. F. LESKOSEK 3,506,947

MOUNTING FOR ELECTRICAL TERMINAL BLOCKS
AND SOCKETS AND THE LIKE
Filed March 18, 1968

INVENTOR
THOMAS F. LESKOSEK
BY Wheeler, Wheeler, House & Clemency
ATTORNEYS

United States Patent Office 3,506,947
Patented Apr. 14, 1970

3,506,947
MOUNTING FOR ELECTRICAL TERMINAL BLOCKS AND SOCKETS AND THE LIKE

Thomas F. Leskosek, Milwaukee, Wis., assignor to Curtis Development & Mfg. Co., Milwaukee, Wis., a corporation of Wisconsin Filed Mar. 18, 1968, Ser. No. 713,892
Int. Cl. H01r 9/00
U.S. Cl. 339—119 6 Claims

ABSTRACT OF THE DISCLOSURE

An extruded channel of any appropriate length has flexible side walls with longitudinal grooves to engage the ends of flat plates upon which electrical equipment such as terminal blocks and sockets is carried. Similarly positioned are identification plates. The channel unitarily provides both fixed and yieldable supports for the intermediate parts of such plates. The sides of the channel have beveled margins and may be sprung laterally to receive or release the plates.

BACKGROUND OF THE INVENTION

Previous devices of this general character have been materially more complex in requiring special carriers for the terminals or sockets to be mounted. One of the advantages of the present arrangement lies in the fact that ordinary flat plates may serve as the carriers and the identification plates. Thus they require no machining for interlock with the channel. Moreover the channel structure itself has advantages in that the plate-engaging surface of the channel side walls, and also the resilient portions of the channel which support the plates, are of such a character as to be readily made by extrusion in any desired length.

Another advantage lies in the fact that the identification of the terminal blocks and sockets is carried on separate data strips or narrow plates which are mounted in the same manner as the carrier plates and are readily interchangeable therewith, whereby it is not necessary that they be mounted on or directly associated with any particular carrier or socket.

DESCRIPTION OF THE INVENTION

As will be apparent from the foregoing statement of advantages, the invention consists in a specific relationship between the mounting channel and the carrier and data plates, the carriers and data strips constituting planiform plates, for the ends of which the channel provides grooves in flexible side walls, the planiform carriers being supported by fixed intermediate stops and held snugly in their respective grooves by the bias of resiliently flexible flanges projecting obliquely upwardly from the bottom of the channel and integral therewith.

Figures 1, 2, 3, 4, 5:
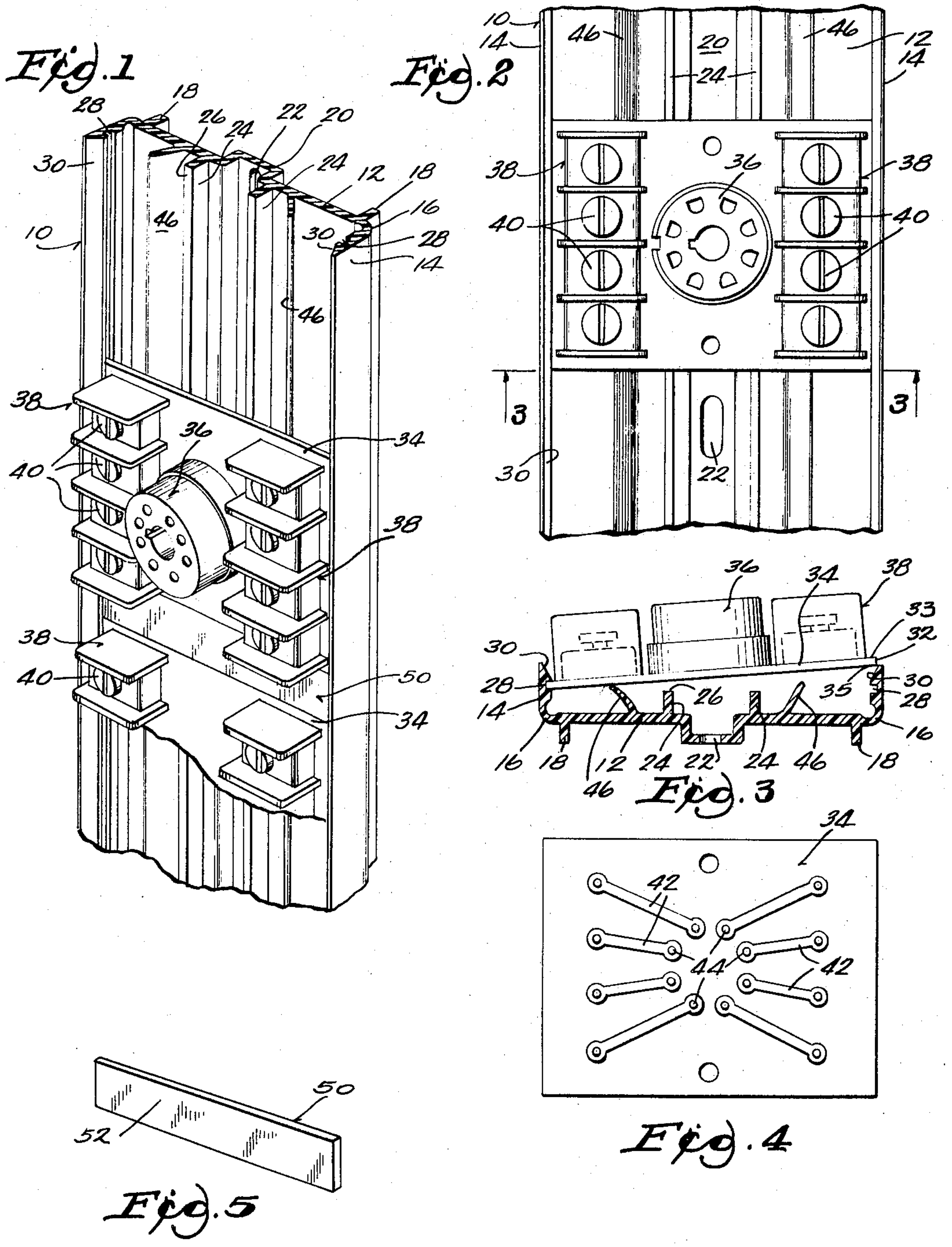
FIG. 1 is a fragmentary view in perspective showing a portion of an extruded channel mounting a plurality of carrier plates and an intervening data strip mounted thereon.
FIG. 2 is a fragmentary view in front elevation showing a portion of a channel and a single mounting plate.
FIG. 3 is a detailed view in cross section on line 3—3 on FIG. 2 showing the carrier in course of a manipulation with respect to the mounting channel.
FIG. 4 is a view of a pre-wired carrier plate in rear elevation.
FIG. 5 is a view of the data strip or plate as it appears in prospective.

The channel generically designated by reference character 10 is extruded, preferably from resiliently flexible synthetic resin, to comprise a bottom wall 12 and side walls 14, the latter being integrally joined to the bottom wall by corner portions 16 which are of reduced thickness to give desirable resilient flexibility accommodating pivotal lateral yielding movement of the side walls with respect to the bottom wall.

Longitudinal ribs 18 projecting downwardly from the bottom wall have their margins flush with an inner channel 20 which may be provided at intervals with holes or slots 22 to receive mounting screws or other fasteners. At both sides of the inner mounting channel 20 are upwardly projecting support flanges 24 having their upper margins 26 in the same plane as inwardly facing grooves 28 with which the side walls 14 are provided. The side walls have increased thickness in the zones in which the grooves 28 are provided and their inner upper surfaces are beveled at 30 to permit the ends 32 of carrier plate 34 to cam the grooved portions of the side walls outwardly in order that the ends 32 of the carrier plate may enter the grooves 28 as shown in FIG. 3.

Any desired fixtures may be mounted on the carrier plate. As examples, I have shown the carrier plate 34 supporting an octal socket 36 and a pair of terminal blocks 38 conventionally provided with terminal screws 40 connected by conductors 42 as shown in FIG. 4 with the terminals 44 which project through the plate 34 from the socket 36.

It will be observed that the carrier plate 34 is flat and not reinforced in any manner. However, it is prevented from sagging or yielding while in use by the support flanges 24 of the channel 10. Additional support is provided by the bias of flexible flanges 46 which project obliquely upwardly and outwardly in opposite directions from the bottom wall 12 of channel 10 as best shown in FIG. 3.

Mounting of the carrier 34 and its attached equipment such as the socket 36 and the terminal blocks 38 is accomplished by engaging one of the ends 32 of the carrier plate in a groove 28 of one of the side walls 14. When the plate is pivoted toward the desired position in the mounting channel 10, it first flexes the oblique flange 46 shown at the left in FIG. 3. Its opposite end 32 then has camming engagement with the bevel 30 of the opposite wall 14 of the channel 10. The last mentioned end of plate 34 approaches the groove 28 in the side wall 14 which has been cammed aside, the plate will then engage and flex the resilient flange 46 which is shown at the right in FIG. 3. When the end 32 which has effected the camming displacement of the right hand side wall 14 reaches the level of the top surface 26 of the central support 24, it will then register with the groove 28 of the right hand side wall. The right hand side wall will then spring back to the position in which the parts are shown in FIGS. 1 and 2, thereby engaging the upper and lower surfaces 33 and 35 of the plate and 32 for securely holding the plate 34 to the mounting channel 10.

The material of which the channel 10 is extruded is sufficiently resiliently flexible so that localized portions of the side walls may be sprung aside to admit additional mounting plates 34 or to release an individual mounting plate previously engaged at its ends with the grooves 28 as above described.

Instead of mounting data strips on the individual carriers or the items fixed thereto, I am able advantageously to identify the respective carriers to the elements mounted thereon by the use of interchangeable data strips 50, one of which is separately shown in FIG. 5. These strips are plates which are identical in thickness and in length to the mounting strips 34, and they have an exposed surface at 52 on which appropriate data may be inscribed or adhered in any desired manner. The data strips are inserted and removed in the same way as the mounting plates 34, being freely interchangeable therewith for use in any desired order on channel 10.

What I claim is:

1. In combination, a mounting channel having a bottom wall and side walls with resiliently flexible portions provided with opposing grooves; and a plate upon which electrical equipment is mounted and having exposed ends with upper and lower surfaces engaged in said grooves and releasable therefrom upon the flexing of at least one of said side wall portions, a plurality of such plates having ends in the grooves of said side wall portions and being individually applicable and removable independently of each other by localized flexing of at least one of said side walls.

2. A combination according to claim 1 in which at least one of said side wall portions has a margin provided with a beveled surface leading to its said groove, whereby the end of said plate can cam said portion aside to facilitate entry into said groove.

3. A combination according to claim 1 in which the bottom wall of said channel is provided between said side walls with fixed supporting means in a plane substantially at the level of the grooves of the said side wall portions and is further provided with oppositely oblique resiliently flexible flanges at opposite sides of the supporting means and having free margins normally projecting beyond said plane.

4. A combination according to claim 1 in which an identification plate substantially identical in length with said first plate has ends similarly engaged in said grooves and is removably supported from said channel independently of said first plate and free of connection thereto.

5. A combination according to claim 1 in which the channel is an extrusion having portions of reduced thickness and increased flexibility intervening, integrally between the bottom wall and respective side walls, the bottom wall having a central sub-channel provided with attachment openings and having rearwardly projecting leg flanges at opposite sides of the sub-channel, said bottom wall further having forwardly projecting support flanges at opposite sides of the sub-channel with margins substantially in the plane of said grooves, and oppositely oblique resiliently flexible flanges between the last mentioned flanges and the side walls and having free margins normally projecting beyond said plane, the said side walls having beveled surfaces leading toward respective grooves.

6. A combination according to claim 1 in further combination with an identification plate substantially corresponding in length to the first mentioned plate and disposed in the same plane and having ends engaged in said grooves in the same manner as the ends of the first mentioned plate.

References Cited

UNITED STATES PATENTS

| | | | |
|---|---|---|---|
| 3,066,367 | 12/1962 | Garman | 339—17 X |
| 3,143,214 | 8/1964 | Moore et al. | 211—26 |
| 3,160,280 | 12/1964 | Burch | 211—89 |
| 3,324,450 | 6/1967 | Winyard et al. | 339—128 |

FOREIGN PATENTS

| | | |
|---|---|---|
| 587,304 | 4/1947 | Great Britain. |
| 739,828 | 11/1955 | Great Britain. |

RICHARD E. MOORE, Primary Examiner